United States Patent
Kennedy et al.

(10) Patent No.: US 11,140,872 B2
(45) Date of Patent: Oct. 12, 2021

(54) ANIMAL COLLAR WITH PROGRAMMABLE MODULAR ELECTRONIC COMPONENTS

(71) Applicants: John Kennedy, Santa Rosa, CA (US); Lisa Tamayo, Santa Rosa, CA (US)

(72) Inventors: John Kennedy, Santa Rosa, CA (US); Lisa Tamayo, Santa Rosa, CA (US)

( * ) Notice: Subject to any disclaimer, the term of this patent is extended or adjusted under 35 U.S.C. 154(b) by 741 days.

(21) Appl. No.: 15/047,985

(22) Filed: Feb. 19, 2016

(65) Prior Publication Data
US 2016/0242393 A1 Aug. 25, 2016

Related U.S. Application Data

(60) Provisional application No. 62/118,068, filed on Feb. 19, 2015.

(51) Int. Cl.
*A01K 27/00* (2006.01)
*A01K 29/00* (2006.01)
*A01K 11/00* (2006.01)
*H04W 4/80* (2018.01)

(52) U.S. Cl.
CPC .......... *A01K 27/001* (2013.01); *A01K 11/008* (2013.01); *A01K 27/006* (2013.01); *A01K 27/009* (2013.01); *A01K 29/005* (2013.01); *H04W 4/80* (2018.02)

(58) Field of Classification Search
CPC .. A01K 27/001; A01K 27/009; A01K 29/005; A01K 27/005; A01K 15/021; A01K 11/008; A01K 15/022; A01K 11/006
USPC ......................................... 119/794, 856, 858
See application file for complete search history.

(56) References Cited

U.S. PATENT DOCUMENTS

| 5,749,324 A * | 5/1998 | Moore | A01K 15/02 119/718 |
| 6,067,018 A * | 5/2000 | Skelton | A01K 11/008 119/721 |
| 6,715,449 B1 * | 4/2004 | Jordan | A01K 27/005 119/863 |
| 7,434,541 B2 * | 10/2008 | Kates | A01K 15/02 119/719 |
| 2011/0120387 A1 * | 5/2011 | Warkentin | A01K 27/005 119/719 |
| 2012/0255505 A1 * | 10/2012 | Gauthier | A01K 15/021 119/721 |
| 2013/0014706 A1 * | 1/2013 | Menkes | A61D 13/00 119/859 |

* cited by examiner

*Primary Examiner* — Peter M Poon
*Assistant Examiner* — Jeffrey R Larsen
(74) *Attorney, Agent, or Firm* — Sheridan Ross P.C.

(57) ABSTRACT

Disclosed modular animal collar systems include a D ring exoskeleton system, a breakaway latch tongue system and other systems. Disclosed collars include auto release systems to ensure that collars do not choke or otherwise injure a pet. Collars include sophisticated electronics to commutate with a pet owner's smart phone but also include means of communication not requiring the use of a smart phone. Collars may include a base collar containing a micro controller and other computer related components. Surrounding modular components may contain additional equipment and may be added as needed by a pet owner. Disclosed collar functions are executed by the disclosed collars and facilitate the retrieval, care and training of a pet.

14 Claims, 12 Drawing Sheets

ANIMAL COLLAR WITH PROGRAMMABLE MODULAR ELECTRONIC COMPONENTS

CROSS-REFERENCE TO RELATED APPLICATIONS AND INCORPORATION BY REFERENCE

This is a utility application based upon U.S. patent application 62/118,068 filed on Feb. 19, 2015. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

BACKGROUND OF THE INVENTION (1) Field of the Invention

The invention generally relates to animal accessories. More particularly, the invention relates to means and methods of creating a modular animal collar system.

(2) Description of the Related Art

The known related art fails to anticipate or disclose the principles of the present invention.

In the related art, animal collars, such as dog and cat collars have been used for restraint, identification and other uses. Many dog and cat collar uses have been known over the last century and include tracking, training, monitoring, shocking the animal with an electric shock, and providing pet door access for the animal. There are now many single purpose animal collars on the market that comprise proprietary electronics and software. It is common for a pet owner to have several single use prior art animal collars for their pet's various needs.

The prior art suffers many shortfalls, including the lack of any standardized or open source software and hardware systems. Prior art collars are of single use and are comprised of "closed" or propriety electronic systems that prohibit system amendments or expansion. Collars of the prior art have failed to adapt to the Digital Age.

Collars of the prior art fail to provide effective mechanical or electro mechanical means of detachment in the event that the collar becomes ensnared or otherwise starts to choke the wearer of the collar. Prior art collars fail to provide modular designs and fail to communicate with today's smart phone systems.

Thus, there is a need in the art for the presently disclosed systems.

BRIEF SUMMARY OF THE INVENTION

Disclosed embodiments overcome shortfalls in the art by providing a modular collar system that may comprise a base collar or base module with the base collar comprising microcontrollers (such as MCU), memory, GPS, nine-axis motion sensors, visual graphic displays, using LED and other means, a modular bus system to power and operate interchangeable collar modules, a battery module connection port and communication systems such as Bluetooth Low Energy (such as BLE) communications.

Disclosed modules or interchangeable collar components may be accessible from the inside surface of the collar so as to protect the modules from environmental factors and unintended removal. Command and control systems within the modules may be controlled by open-source firmware and software so as to allow third parties to create new functionality.

Various collar systems are disclosed and contemplated. For example, a breakaway no leash version features a safety mechanism that allows the collar to open and release upon the application of a predetermined amount of pull or pressure upon the collar. A D-ring exoskeleton embodiment is also disclosed and may use a load cell assembly to enable actions to be automatically taken given a predetermined amount of pull such as electronic shock or sound played from speaker.

A breakaway-latch tongue system prevents strangulation, sends an electronic signal when the collar has self-released.

A breakaway-latch tongue system may comprise a breakaway-latch tongue portion of the collar that includes two male portions on either end. The first male portion is for the breakaway feature that includes a magnet to activate the female portion of the breakaway to signal whether the breakaway is closed or open. The second male portion includes teeth that vary the circumference of the collar to fit the pet by sliding in and out of the female portion that includes teeth comporting to the latch system. Multiple lengths of the breakaway-latch tongue allow for the collar to be sized further beyond just the length of the latch teeth.

Disclosed embodiments overcome shortfalls in the art by use of a detachable battery system, the batter system may comprise the use of one or more standard 2.5 mm four conductor jack connections or other connection for both physical attachment and electrical conductivity. Disclosed battery systems may be attached to a module to eliminate battery heat upon a collar base, use a standard O-ring seal, maximize surface area for heat dissipation and have a mounting system to articulate and deflect in response to a pet's movements. The manufacture of a disclosed battery system minimizes battery degradation as the manufacturing process eliminates exposing the battery to molding temperatures. A battery latch release is designed for human use and not pet use, thus reducing the risk of accidental release by pets.

Disclosed embodiments overcome shortfalls in the related art by presenting an unobvious and unique combination and configuration of methods and components to construct a modular appendage encircling collar that secures around an animal's neck. The presently disclosed embodiments include a central module that comprises a microcontroller or central processing unit, memory, a graphical display screen, wireless communication such as Bluetooth, WiFi and low power long range, global positioning satellite (GPS) receiver, an assortment of sensors such as accelerometer, gyroscope, magnetometer, geomagnetic, gravity, temperature, humidity, atmospheric pressure, force measuring load cells, lights including visible and ultraviolet, one or more microphones, one or more speakers including those able to emit ultrasonic sound heard by dogs, a vibration motor, and additional components. The list of these various components is not exhaustive. The various components may reside within a central module or an auxiliary module.

The present invention overcomes shortfalls in the art by providing the central module means of power and communication transmission to a plurality of auxiliary modules that may attach to a common dog or cat collar strap. Auxiliary modules may share a power line and/or communication line with the central module. Each auxiliary module may be of a single function or comprise multiple functions. A contemplated embodiment includes the use of a battery auxiliary module with means of conversion of movement to power and power storage. Auxiliary modules may comprise sensors as described above. Auxiliary modules may comprise third party applications and/or hardware as the software and firmware of the central module may comprise open source applications and protocols.

Auxiliary modules may be connected to or communication with the central module by any means including USB, SPI, I2C, Bluetooth and others.

The central module may comprise an open application programming interface (API) that allows users and third-parties to create additional software applications that provide additional functionality. Auxiliary modules may also include additional APIs to enable an auxiliary module's attributes.

Auxiliary module attributes may include any function and may include functions complementary to those of the central module.

Embodiments of the invention may also include the use of electric shock to the animal, machine to machine communication (cellular) with removable SIM card, electric energy generation, invisible fence sensor, pet door activation, image camera for video and still imagery, light emitting and reflecting systems, and user or third-party created modules.

A variety of central module and auxiliary module shapes are available to provide different uses including conductive contacts that make contact with an animal's skin for shock collar modules and vital measurements of the animal, LED "antennae" for visibility of long hair animals, and configurations that allow for large electronic packages. An LED antenna and/or antennae system may also be used for and/or configured to make an animal more visible to scare off other animals. Disclosed embodiments include modules with displays are designed to have the displays angled to minimize contact and force of animal's claws during scratching actions.

Disclosed embodiments may be controlled and/or monitored by a graphical user interface on the animal collar's display, through applications on mobile phones running Apple's iOS, Google's Android, and Microsoft's Windows operating systems, as well as from a web page or web interface accessed over the Internet. Disclosed embodiments may include a graphical display capable of displaying images and text as well as a speaker are included in the collar as human interface output. A microphone and a 9-axis motion sensor are included in the collar as human interface devices for input.

Disclosed embodiments enable new functionality to be added to the collar by adding new modules or writing new applications that run on the collar, mobile phone, web site, or a combination of these. The mobile phone and web site collar software also displays apps that have been created by third-parties and made available for free or for a small fee.

These and other objects and advantages will be made apparent when considering the following detailed specification when taken in conjunction with the drawings.

Figure 1:
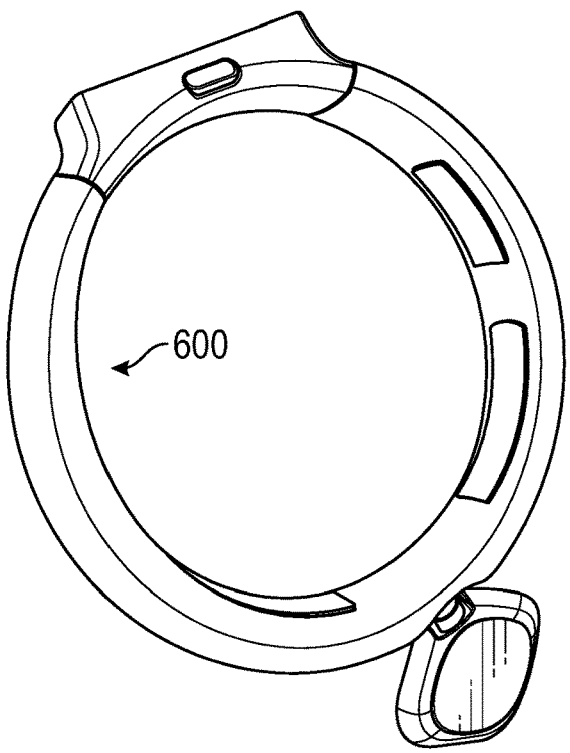
FIG. 1 depicts a perspective view of a modular animal collar

REFERENCE NUMERALS IN THE DRAWINGS 100 an animal such as a dog or cat
200 a modular collar system
210 flexible collar base or connective band
250 axillary module with animal sensors or electric shock terminal
253 animal sensors or electric shock terminal
260 axillary module
270 central module
280 axillary module
290 axillary module
295 graphical interface or display of central module
300 GPS network
310 cellular or wireless network
320 WiFi network
400 electronic devices in communication with a modular collar system 200
450 Bluetooth wireless network
460 communication between collar and Bluetooth wireless network 450 and/or electronic devices 400
500 cloud storage systems
600 breakaway collar system
610 latch tongue
612 teeth upon a latch tongue
620 latch tongue base
622 lock insert of latch tongue base
624 void for lock insert 622, defined within the latch tongue body
630 latch tongue body
632 Hall effect sensor sometimes contained within the latch tongue body or other parts of a collar
640 screen of breakaway collar system
650 sound chamber
655 speaker
656 speaker cover section
657 ambient microphone
658 microphone of breakaway collar system
659 pet microphone
660 module of breakaway collar system 670 flex circuit of breakaway collar system
680 female section or female void of latch tongue assembly
   682 lower lip of female section 680
   684 upper arch of female section 680
   685 void of female section, defined by the lower lip 682 and upper arch 684
   686 ratcheting mechanism
   700 battery pack
   710 jack or other connector between battery pack and collar
   800 exoskeleton collar
   810 flexible outer shell component
   820 module of exoskeleton collar
   840 speaker of exoskeleton collar
   850 display of exoskeleton collar
   860 load cell assembly
   863 load cell body
   865 attachment void, defined within load cell body 863
   867 D ring of load cell assembly
   869 swivel pin of load cell assembly
   870 fastener to retain swivel pin 869

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

FIG. 1 depicts a perspective view of a disclosed breakaway collar system 600.

Figure 2:
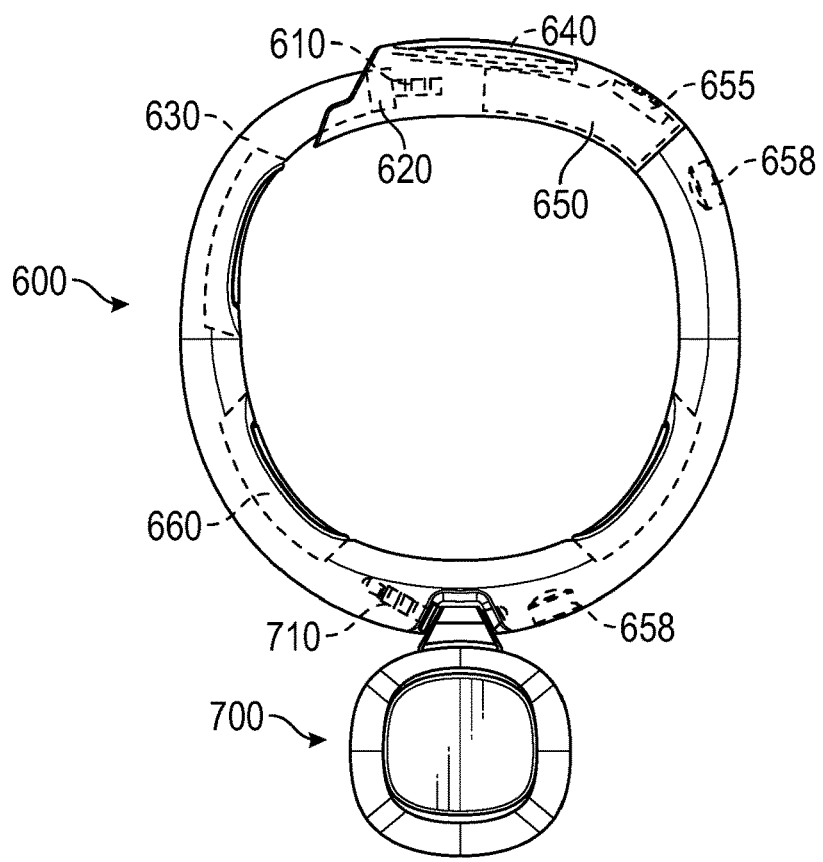
FIG. 2 depicts a front view of a modular animal collar

FIG. 2 depicts a breakaway collar system 600 having a latch tongue 610, latch tongue base 620, latch tongue body 630, a display screen 640, sound chamber 650, speaker 655, and various microphones that may include a microphone 658, a module 660 and other parts as shown and described herein. A collar system may include a removable battery pack 700, the battery pack may comprise a jack 710 or other attachment and/or electrical connection system.

Disclosed embodiments prevent pet strangulation, produce a signal upon auto release, may be produced in multiple sizes to comport with any neck size.

Figure 3:
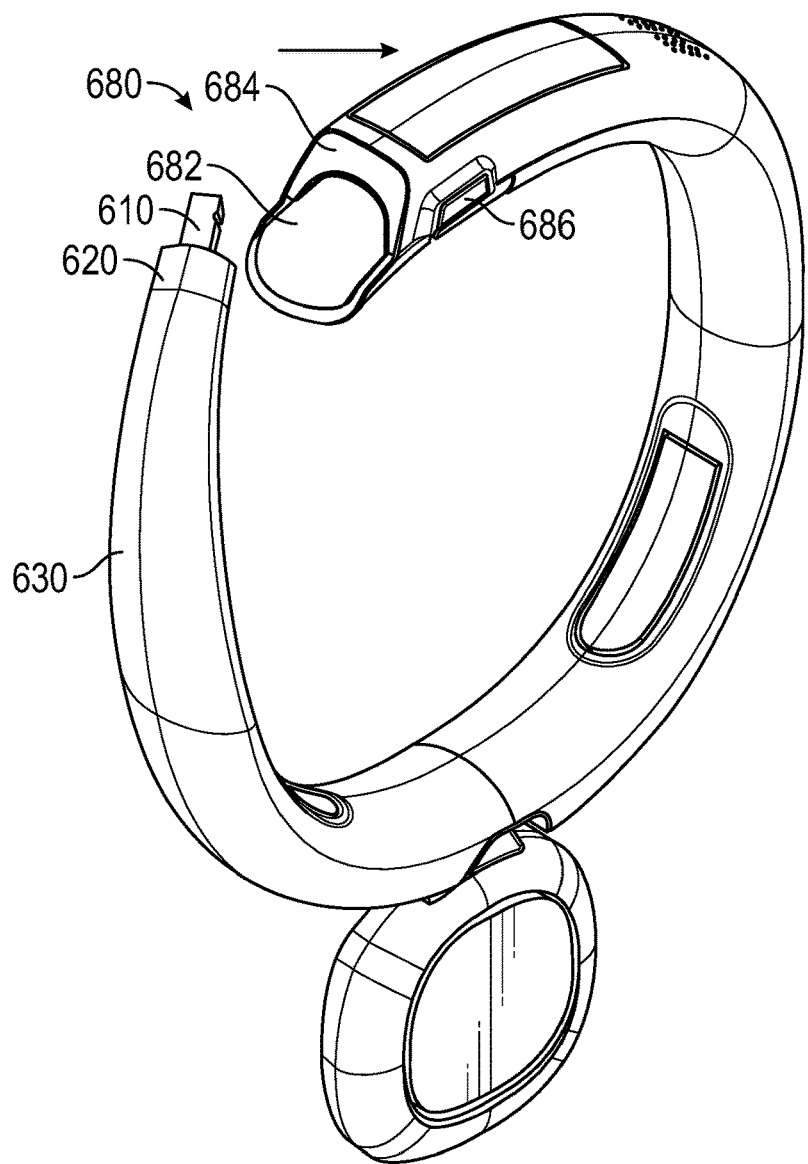
FIG. 3 depicts a perspective view of a modular animal collar in an open position

FIG. 3 depicts a perspective view of a modular animal collar in an open position wherein a latch tongue body 630 as a proximal end attached to the collar and a distal end attached to a latch tongue base 620 with the latch tongue base attached to a latch tongue 610. The latch tongue 610 may comport to a ratcheting mechanism 686 contained within the collar. The ratcheting mechanism 686 may be positioned near or adjacent to a female section 680 of a latch and tongue assembly. A female section of a latch and tongue assembly may be defined by a lower lip 682 and an upper arch 684. The lower lip 682 and upper arch 684 may be configured to provide sliding means of movement of the latch tongue base 620 and latch tongue 610 from an open position, as shown, and a locked position, secured within the ratcheting mechanism 686.

The ratcheting mechanism 686 may be set to a tension or mechanical setting to allow the latch tongue 610 to release upon a predetermined amount of tension upon the latch tongue body. This feature overcomes shortfalls in the related art as the collar will not remain attached if the collar is ensnared or otherwise threating to the safety of the wearer of the collar. The lower lip 682 may be convex in shape to comport with a smooth inner surface presented to the wearer and to facilitate a smooth mechanical movement to and from the ratcheting mechanism 686.

Figure 4:
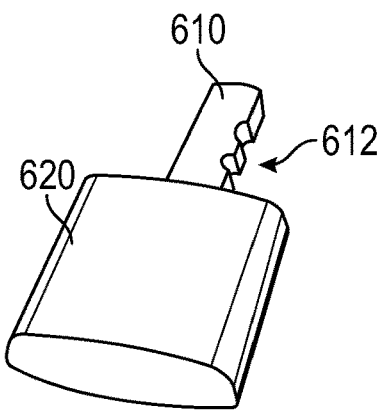
FIG. 4 depicts a perspective view of a latch tongue

FIG. 4 depicts an expanded view of a latch tongue base 620 attached to a latch tongue 610, with the latch tongue having teeth 612 or other features to comport with the locking mechanisms of the ratcheting mechanism.

Figure 5:
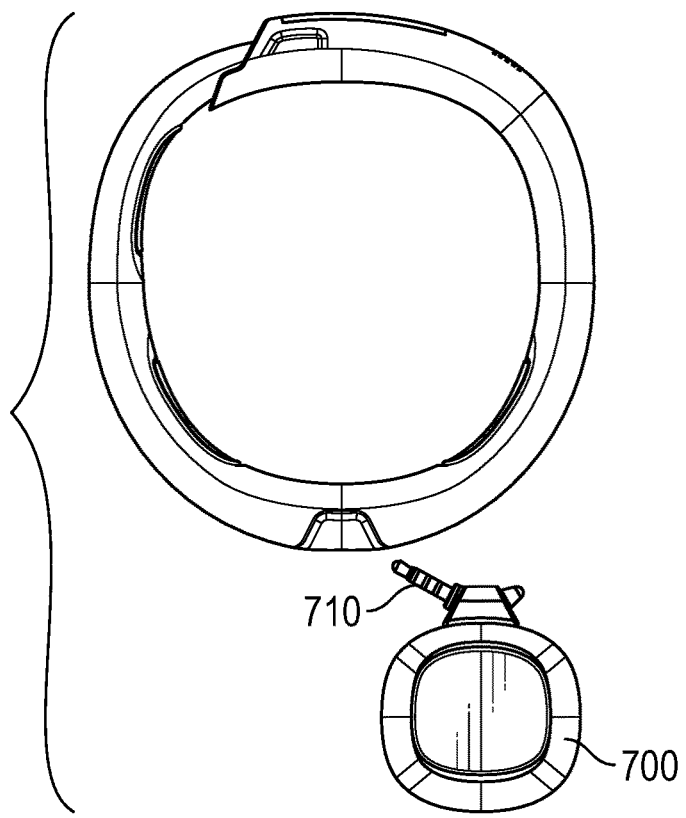
FIG. 5 depicts a collar and battery assembly in a detached position

FIG. 5 depicts a collar detached from a battery pack 700, with the battery pack shown with means of attachment which may include a jack 710 or other means of mechanical or electrical attachment.

The battery pack 700 or the battery module is an external module that electrically connects to the collar using a 2.5 mm jack connection. This allows a battery to be removed and replaced without removing the collar from the pet. Another advantage over the prior art is that any heat generated by the battery during discharge is not in contact with the pet or the collar as the battery is physically isolated from the collar and pet. Additionally, due to the battery module design, the external battery module is not subjected to high heat during manufacturing due to not having an over-molded elastomer design.

Figure 6:
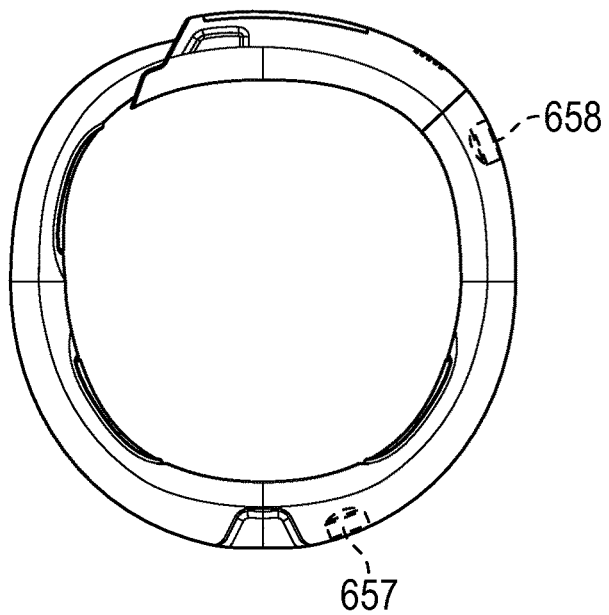
FIG. 6 depicts a collar with microphones

FIG. 6 depicts a collar having a plurality of microphones which may include an ambient microphone 657 and standard microphone 658. The standard microphone may be configured to capture voice commands or sounds generated by an animal owner. The ambient microphone may be configured to capture ambient sound, with the ambient sound sometimes used in a noise cancellation system contained within the collar.

In a disclosed embodiment, a plurality of microphones are fully integrated into a collar to capture ambient sounds and sounds generated by the pet. On board electronics differentiate between pet noises and ambient sounds. In one embodiment, the collar contains two microphones. A first microphone is near the top of the collar and outward facing, picking up ambient sounds around the pet. A second microphone is on the inside bottom surface of the collar adjacent to the pets throat. The second microphone may receive the pet's own sounds including barks, meows, cries, breathing, and blood flow sounds.

Figure 7:
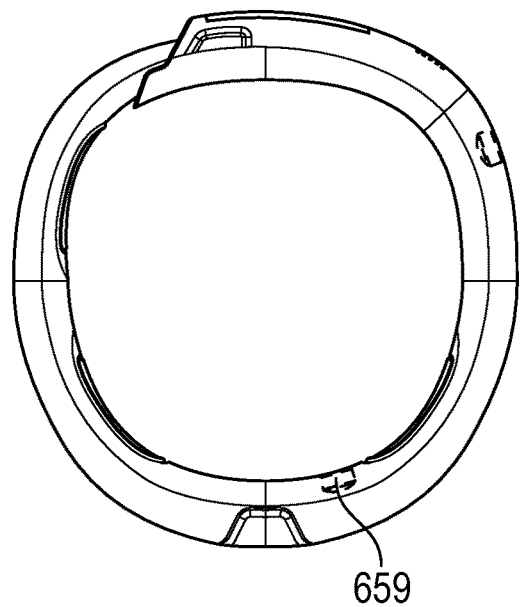
FIG. 7 depicts a collar with microphones

FIG. 7 depicts a collar having a pet microphone 659. A pet microphone may be configured to capture sound generated by a wearer of the collar.

Figure 8:
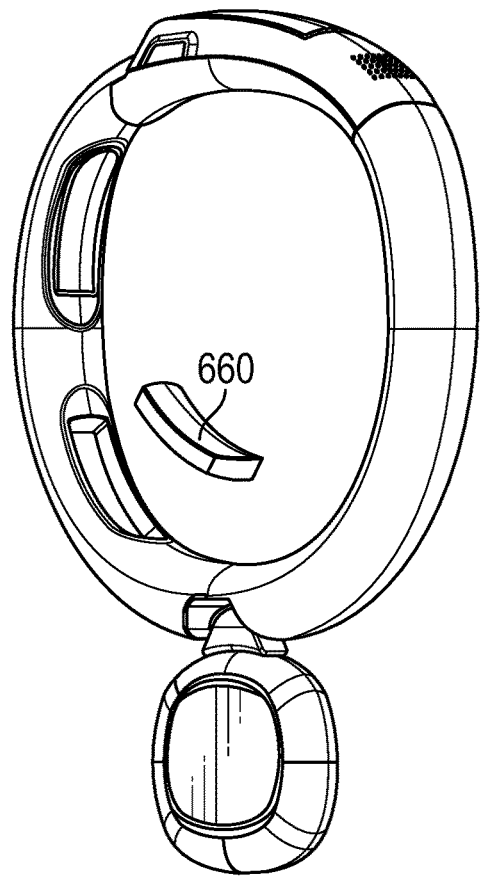
FIG. 8 depicts a collar with a module removed

FIG. 8 depicts a collar having modules, with a module 660 shown in a removed position.

Figure 9:
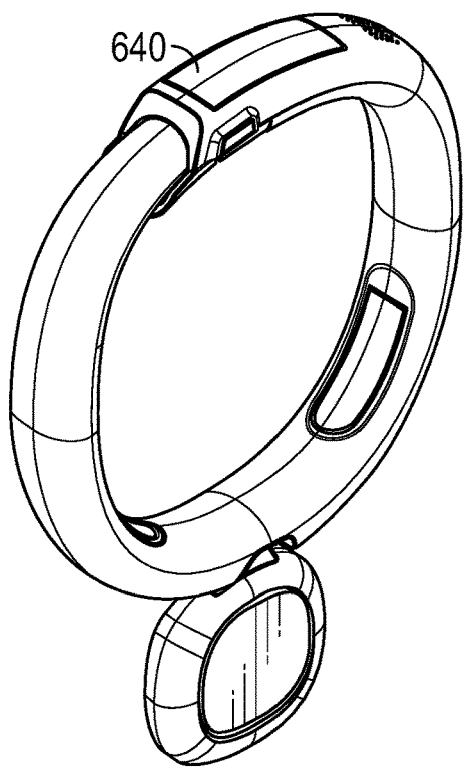
FIG. 9 depicts a collar with a display screen

FIG. 9 depicts a collar with a display screen 640. The contents of the display screen include the contents of the screen in FIG. 19.

Disclosed display systems include the first OLED application on a pet collar and provides programmable means to display any graphic content. The display may include various lights for illumination for pet safety and a two-way interaction using a motion sensor. The display may disclose or project pet and owner information as well as license, rabies and other information. Vaccination, feeding and other reminder information may also be presented upon the display.

Interactivity and screen display features also include that ability of the system to sense a feeding of the pet. The time of the feeding may be displayed upon the display system so that other caretakers do not over feed the pet.

A display 640 may provide readable written notifications on the collar to alleviate the need for the pet owner or any human care giver to need a smartphone or other device to read the notification. Human interaction with the collar is confirmed through the graphical display for module activation, wireless signal strength, battery strength, reminder cancelation, feeding notifications and confirmations, and other items. The display is fully configurable via programming.

Figure 10:
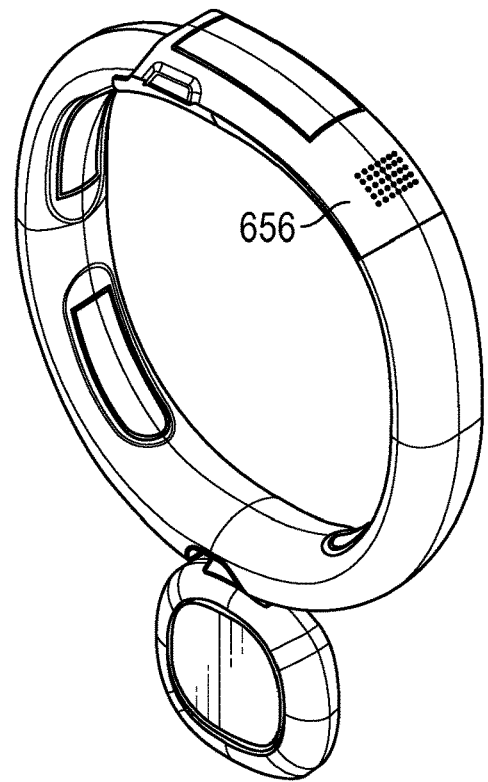
FIG. 10 depicts a collar with a speaker system

FIG. 10 depicts a collar with a speaker cover section 656. The speaker cover may protect in inner speaker.

Figure 11:
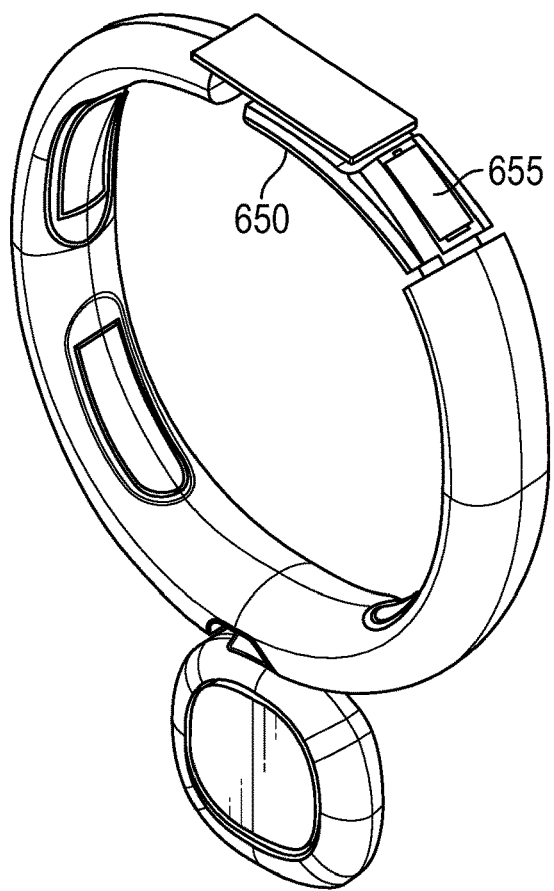
FIG. 11 depicts an exposed speaker system

FIG. 11 depicts an inner or internal speaker 655. The speaker may be connected to a control center or other system accepting input from a system user. A speaker may transmit sound to a wearer of the collar or a bystander near the collar.

A disclosed speaker system may include a fully integrated speaker system that may include a resonant chamber integrated into a collar. In one disclosed embodiment, a small speaker is integrated into the collar along with a resonant chamber. This configuration ensures the speaker sounds are heard by the pet as well as humans in the surrounding area where the pet is located. The speaker may play a variety of sounds to communicate commands, audio markers for training, and alerts for humans for reminders as well as calls for help when the pet or collar is lost.

Figure 12:
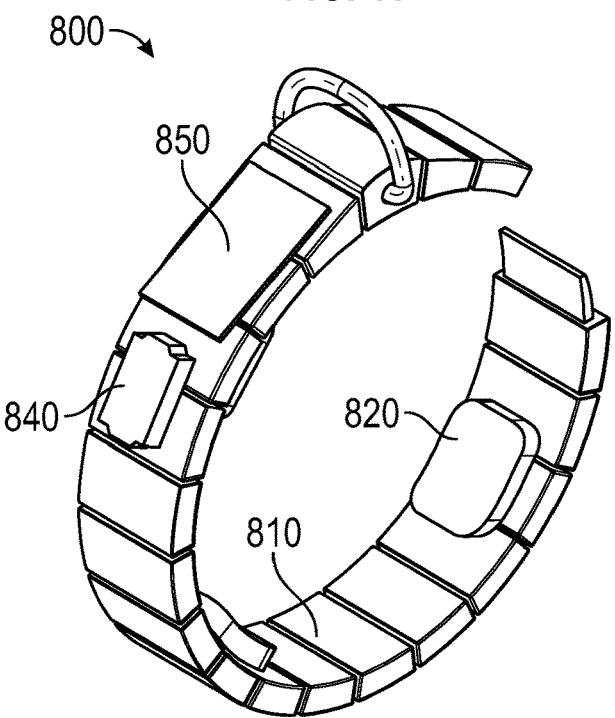
FIG. 12 depicts a collar in a D ring exoskeleton configuration in a detached position

FIG. 12 depicts an exoskeleton embodiment 800 which may comprise a plurality of connected outer shell components 810 or flexibly attached links, one or more modules 820, one or more speakers 840 and one or more display screens 850.

An exoskeleton embodiment is a pet collar that includes an assortment of electronics to enable collar functionality to be expanded by adding additional electronic modules by connection to a common bus imbedded in the collar. The assortment of electronics and expandable modules allows the collar to have unlimited functionality A disclosed exoskeleton dog collar 800 overcomes shortfalls in the art in many ways, such as distributing forces exerted upon internal circuitry and protecting exposed items such as the display and battery. The linking of the components allows for flexibility in the collar. In general, a D-ring collar will be subjected to very strong forces and the electronic circuitry of the collar will need to be protected from such forces. The exoskeleton structure of the dog collar isolates the forces caused by pulling on the D-ring, pulling anywhere on the collar, biting on the collar, or scratching of the collar from being transferred to the electronics of the collar. This ensures that the collar will be rugged enough to survive the harsh environment of a dog collar.

Figure 13:
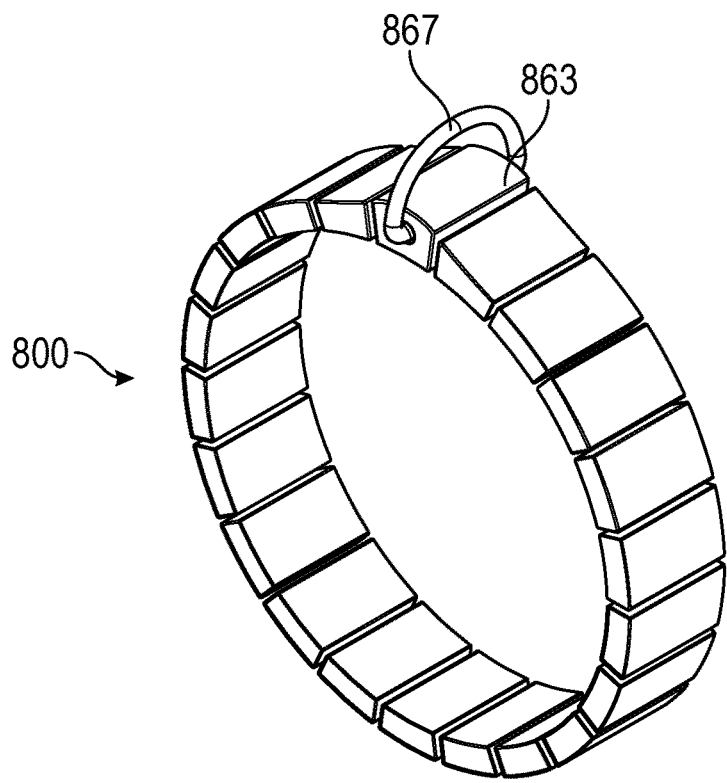
FIG. 13 depicts a collar in a D ring exoskeleton configuration in a closed position

FIG. 13 depicts an exoskeleton embodiment 800 which may comprise a D ring 867 or other attachment configuration attached to a load cell body 863.

Figure 14:
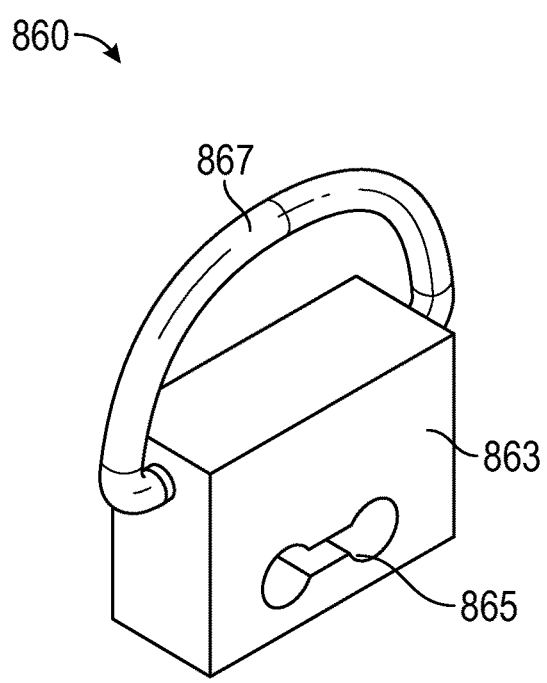
FIG. 14 depicts a D ring and load cell

FIG. 14 depicts a load cell assembly 860 which may comprise a load cell body 863 with the load cell body containing or defining an attachment void 865. In general, a lip or male member may comport to the attachment void to secure the collar upon a wearer. The load cell assembly 860 may provide means of collar actions such as electronic shock or emitting sounds based on electronic signals when load cell is pulled.

A disclosed D ring may measure external or "pulling" forces exerted upon the leash. Force vectors may be measured and trigger a variety of actions. In a disclosed embodiment, a collar suitable for dogs and other animals includes a D-ring that is intended to be attached to a leash. The D-ring is connected to a load cell for measuring force electronically. This signal is used by the collar's electronics to trigger various collar module training systems such as electric shock, vibration, and audio sounds produced by the collar's speakers. This system may be used to assist in training the pet not to pull on the leash among other training lessons.

Figure 15:
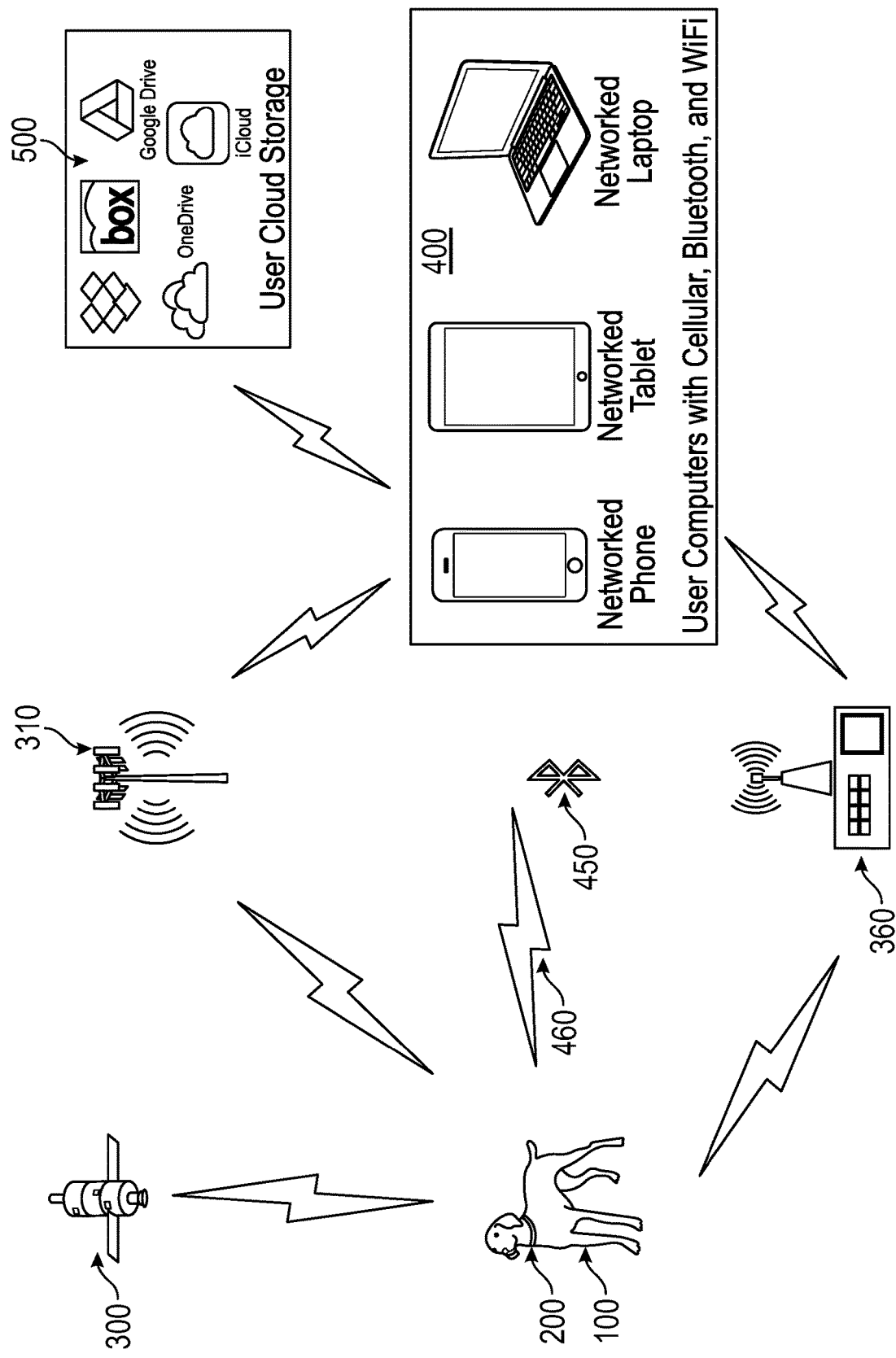
FIG. 15 depicts a schematic view of a disclosed embodiment and related communication systems

FIG. 15 depicts a disclosed system that may comprise a dog 100 or other animal wearing a modular collar system 200. The modular collar system 200 may be communication with a GPS network 300, a cellular network 310, a WiFi or low power long range network 360 and a plethora of electronic communication devices 400. The communication devices may be in connection with user cloud storage systems 500.

Figure 16:
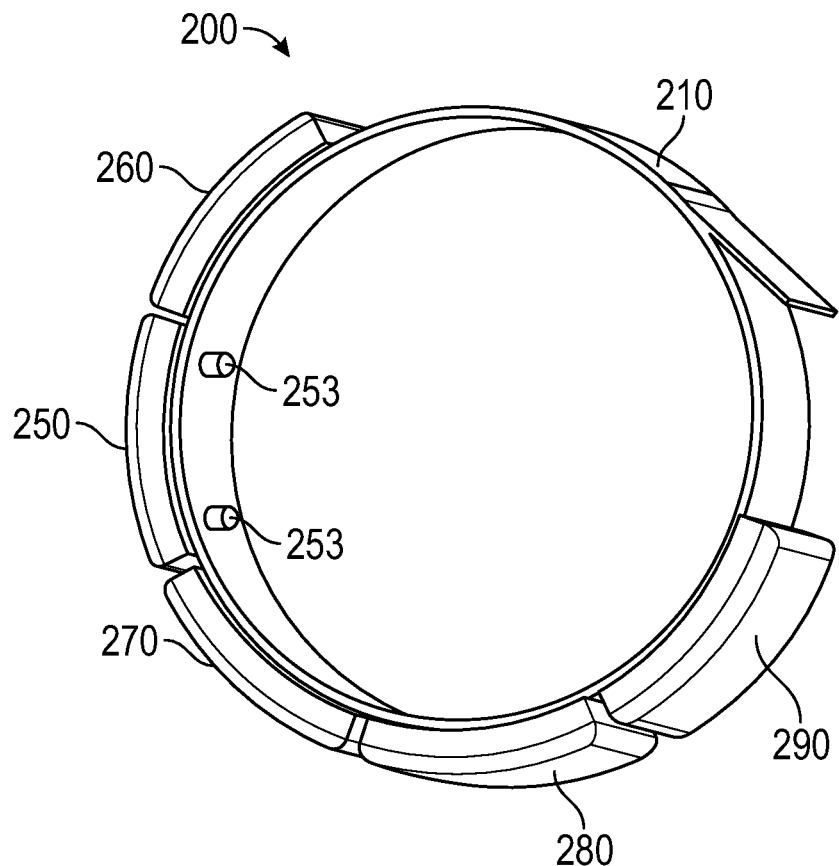
FIG. 16 depicts a perspective view of a disclosed embodiment

FIG. 16 depicts a disclosed modular collar system 200 which may comprise a flexible collar base 210 or connective band. The flexible collar base may retain a central module 270 and a plurality of axillary modules. In the present example, an axillary module 250 with animal sensors 253 may obtain animal information and transmit the information to the central module. The animal sensors may also act as means of transmission for shocking the animal.

Axillary modules 260, 280, 290 and others not shown may comprise third party hardware and software and communicate with the central module 270. Auxiliary modules may contain components for communications, RFID for pet door control, and other functions as described above.

Figure 17:
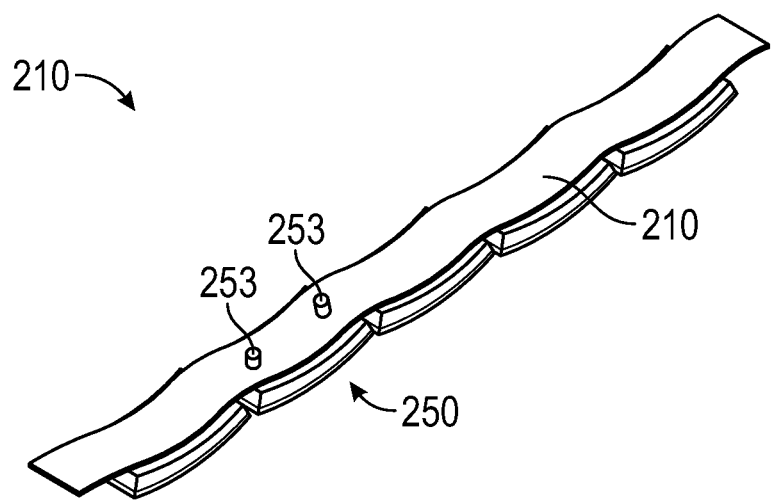
FIG. 17 depicts an underside perspective view of a disclosed embodiment

FIG. 17 depicts a bottom perspective view of a modular collar system 200 which may comprise a flexible collar base 210, a central module and auxiliary modules. An axillary module 250 with animal sensors 253 is shown.

Figure 18:
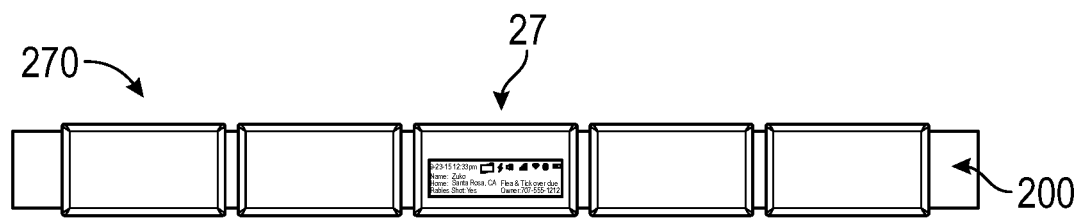
FIG. 18 depicts plan view of a disclosed embodiment
Figure 19:
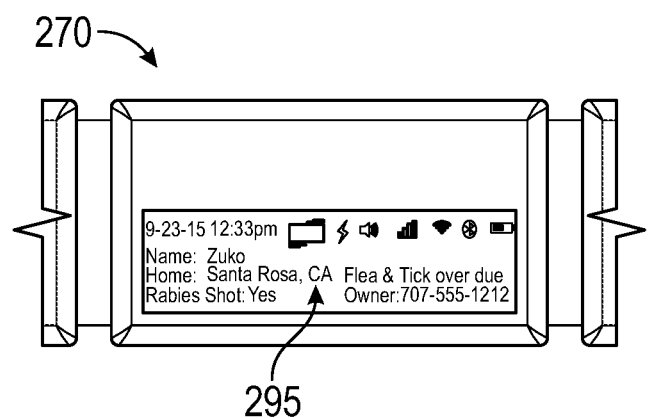
FIG. 19 depicts an enlarged plan view of a disclosed user interface or display system

FIG. 18 depicts a top plan view of a modular collar system 200 comprising a central module 270, with the central module comprising a graphical interface, shown in more detail in FIG. 19.

FIG. 19 depicts an expanded view of FIG. 18 and shows a graphical interface 295 of a disclosed central module 270. The graphical interface may include animal identification information, medical information, such as rabies shots, owner contact information, sensor information and other system information.

Figure 20:
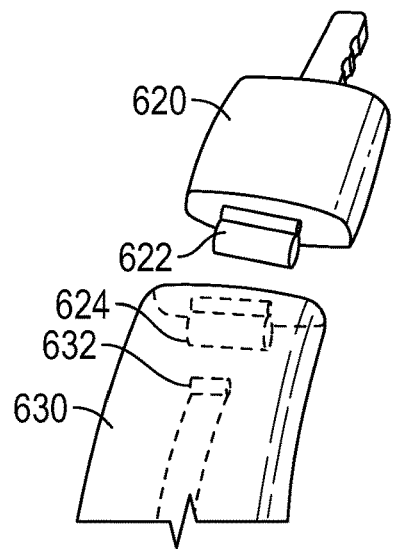
FIG. 20 depicts a latch tongue base and related components

FIG. 20 depicts a latch tongue base 620 having a lock insert 622, the lock insert 622 may fit into or comport with a void 624 for the lock insert, the void 624 defined within the latch tongue body 630. The latch tongue body 630 may contain a Hall effect sensor 632 which changes state in the event of the collar being in a closed or open position. The Hall effect sensor 632 may be in communication with the CPU and other collar electronics to report the closed or open state of the collar. An open collar may trigger a lost collar function as described herein.

Figure 21:
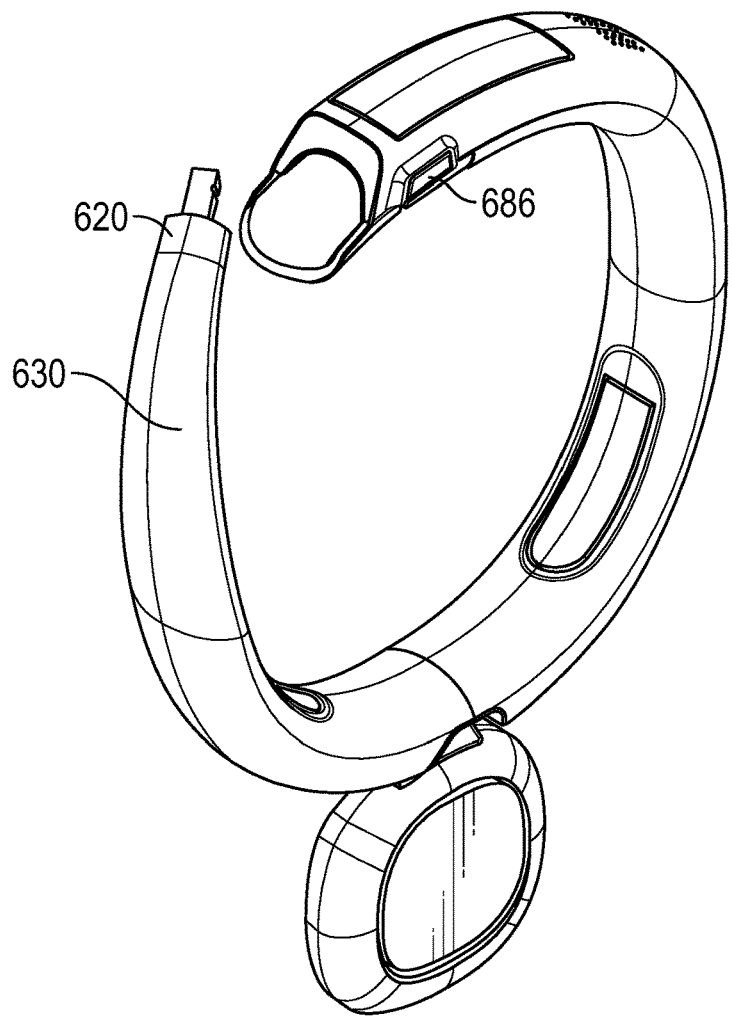
FIG. 21 depicts a collar

FIG. 21 depicts a disclosed collar and attached battery system.

Figure 22:
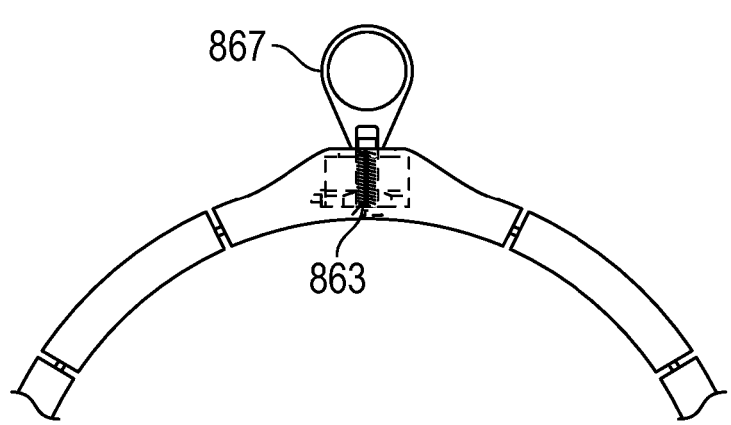
FIG. 22 depicts a load cell system integrated into a collar

FIG. 22 depicts a swivel type D ring system sometimes used with a collar designed for leash use. The D ring 867 may retain a leash and a D ring may be connected with a swivel (869 FIG. 25) and/or load cell body 863. A load cell body may sense pull, moments of pressure or other forces exerted by the pet upon the leash and report such forces to the CPU and/or other electronic components of the collar. The reported forces may be used by the collar to trigger collar vibrations dissuade the pet from pulling upon the collar. The reported lease forces may be used for other collar/dog training functions.

Figure 23:
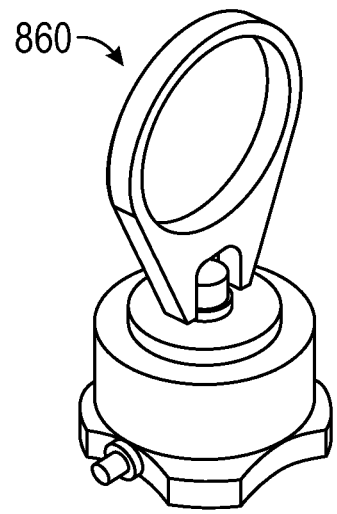
FIG. 23 depicts a load cell system

FIG. 23 depicts a disclosed load cell assembly. The electrical and/or mechanical connection points to the CPU and/or other collar components are not shown.

Figure 24:
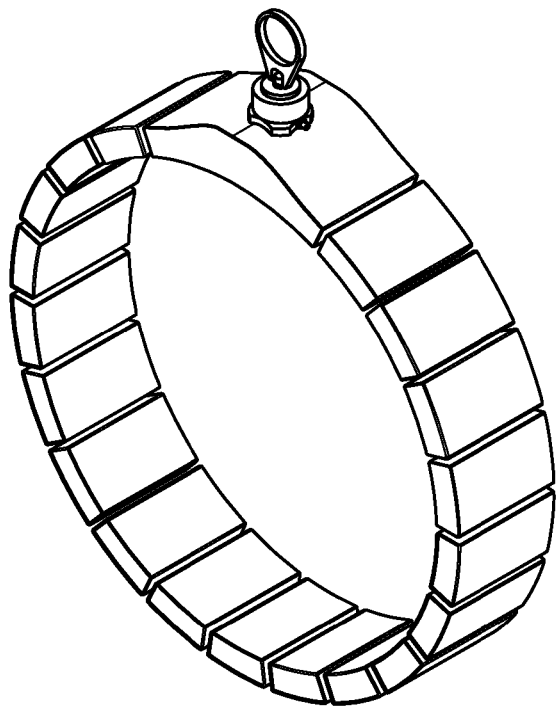
FIG. 24 depicts a collar and load cell system

FIG. 24 depicts a disclosed collar having a disclosed load cell assembly with a swivel D ring embodiment.

Figure 25:
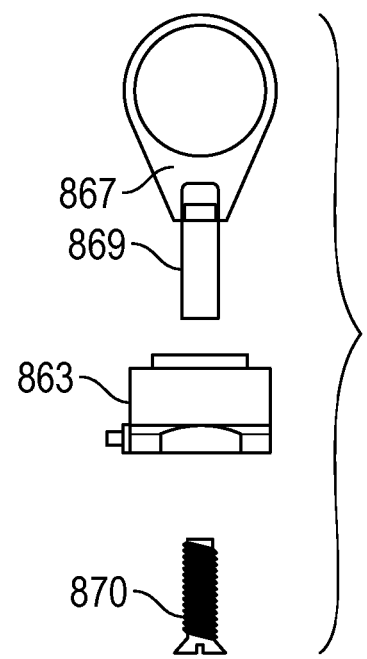
FIG. 25 depicts an exploded view of a load cell system

FIG. 25 depicts an exploded view of a load cell assembly which may comprise a D ring 867, attached to a swivel 869, which may be mated to or comport with a load cell body 863. A fastener 870 may be used to help retain the swivel 869.

Other attributes, systems are disclosed herein overcome shortfalls in the prior art and include the following.

The modularity of the collar presents new attributes and advantages. The functionality of the collar can be modified by adding electronic modules to the base collar to increase overall functionality. The circuitry of the base collar recognizes the new module and provides power, core processing power, memory storage, RF communications, and graphical display to enable intended features of the added module. Additional modules can include functionality for opening of pet doors, invisible fences, vibration training, electric shock training, ultrasonic and audible sound training, additional RF communications, video cameras, as well as working with existing manufacturer products. The module feature of the collar may be an open hardware platform thereby allowing third-party developers the ability to build new modules.

A new lost animal mode or lost animal state provides new advantages in pet recovery. With a disclosed collar in use, a pet owner may configure a polygon of pet confinement using a series of three or more longitude and latitude coordinates. A collar GPS chip can determine if the pet is inside or outside of the pet owner's defined area of pet confinement. When the collar's GPS chip determines that the dog is outside the area of confinement or if the GPS chip is not able to connect to the any previously connected smartphones using Bluetooth, then the collar switches to lost animal mode.

In a disclosed lost animal mode, the LED lights begin flashing, the display displays the pet's name and owner's phone number, and an audio message announcing the lost animal's name is played over the speaker at high volume. This messaging repeated at a configurable frequency and the rest of the collar goes into low power mode. If a long range radio frequency module is installed, then the owner is notified of the animal being lost and the lost animal's coordinates at regular intervals.

A disclosed lost collar mode provides valuable information and features to pet owners. In the normal use of any animal collar, the collar is known to come off of the animal and the collar cannot be found.

A disclosed collar is designed to assist the user in finding the collar when one of two conditions exist. The first condition is for the collar that includes a breakaway feature. When the collar breaks away from the animal when the male portion pops out of the female portion an electric signal is triggered indicating the collar has come off. The second condition is if the motion sensor does not sense any motion for more than 24 hours. If either of these conditions are met, then the collar's Lost Collar Mode is triggered. In this mode, the collar will go into sleep mode and wakes up several times after night fall at the top of the hour and sounds an alarm over the speaker and flashes the LED lights for several minutes. This messaging increases the probability of the owner finding the lost collar. Triggering the lost collar mode after night fall and at the top of an hour overcomes shortfalls in the art as a searcher will know when to expect an audio and/or visual signal. The visual signal will be more noticeable after nightfall.

Disclosed embodiments assist in behavior capture and behavior modification. When the owner of an animal wearing this collar observes behavior that is of interest, the owner can use the collar's smart phone app to record video of this behavior. When this is done the motion sensor data and microphones audio data is collected by the collar, sent to the smart phone and is time synchronized with the video. This package of information is then shared with developers. This allows developers to use this information as a behavior "print" that can be used programmatically to initiate new or existing actions on the collar to encourage or discourage such behavior.

The "print" of the behavior can be recognized in the future as the accelerometers in the collar may transmit data to the collar's internal computer system. The accelerometer data may be matched to the prior recorded "print" of behavior labeled as interesting by the owner. Upon such a match the owner may be notified via the electronic means disclosed herein.

Disclosed embodiments may include a bird deterrent mode wherein the presence of birds may be perceived or sensed by the collar's motion sensors and/or microphones. If appropriate, birds may be deterred by use of the collar's speaker and display system by use of sound and light. The display system may produce flashing LED light as well as UV LED light.

Disclosed embodiments may include a Not My Feeding Bowl function. Such a function may include the use of a Bluetooth chip that can detect Bluetooth beacon signals from other Bluetooth chips. A pet's feeding bowl can be configured with a Bluetooth beacon that is assigned to the pet's collar. At this point, when the animal approaches another feeding bowl with a Bluetooth beacon that is not recognized by the collar, the collar persuades the pet to leave the feeding bowl through audio command, vibration or electric shock. Disclosed embodiments may include a shock module and vibration module attached to a collar.

Similar to the Not My Feeding Bowl feature, a Stay Away function, using a Bluetooth bacon, may be used to prevent the animal from entering areas the animal is not desired such as bedrooms, kitchen, and dining room.

Disclosed embodiments may include a Force Pull Trigger function used with a disclosed D ring system. When the collar's D-ring is pulled with sufficient force, the load cell sensor signal triggers various actions in the collar that can be used in training as well as discouraging pulling of the collar. Other actions and/or behavioral modifications may also be encouraged.

Disclosed embodiments may include the following items.

Item 1. A modular break a way collar system (600) with integrated electronic components used for pet tracking and pet training, the system comprising:

a) machine readable instructions stored upon non-volatile memory, the machine readable instructions read by a CPU or MCU, the CPU in communication with a display system, speaker system, microphone system, a motion detection system, radio communication system, GPS and a detachable battery system;

b) a collar detachment system comprising a collar body having a first end attached to a latch tongue body (630), the latch tongue body attached to a latch tongue base (620), the latch tongue base attached to a latch tongue (610), the latch tongue comprising teeth (612), the collar body having a second end comprising a female void (680) the female void defined by a lower lip (680) and upper arch (684), the second end of the collar body containing a ratcheting mechanism (686) the ratcheting mechanism comporting to the teeth of the latch tongue;

c) the machine readable instructions including a behavior capture function wherein user selected motion data from the motion detection system is recorded to the non-volatile memory and future instances of the user selected motion data trigger a message to a pet owner;

d) the machine readable instructions including a lost collar function wherein a radio signal is generated by the radio communication system in the event of either 1) the latch tongue body separated from the latch tongue base or 2) the motion detection system fails to record motion during a predetermined time period;

e) the machine readable instructions including a bird deterrent function wherein the display produces LED flashes, UV LED flashes and the speaker system produces audio sounds in the event of a bird being perceived by either 1) the microphone system or the 2) motion detection system;

f) the machine readable instructions including a lost animal function wherein the CPU or MCU and non-volatile memory accept user entered coordinates delineating a polygon area of containment, in the event that the GPS senses that the collar is outside of the polygon area of containment, the display system displays an animal's name, an owner's name and an owner's phone number, the speaker system generates an audio message containing a message indicating that the animal is lost and containing the owner's name and the owner's phone number and a message is transmitted by the radio communication system.

Item 2. The system of above wherein the microphone system comprises a pet microphone and an ambient sound microphone.

Item 3. The system of above wherein the ambient sound microphone is located at the top of the collar and the pet microphone is located within the inside surface of the collar upon the animal's throat.

Item 4. The system of above wherein the display system comprises the display of images and text to comprise a human interface output and wherein the speaker system comprises audio messages to further comprise the human interface output.

Item 5. The system of above wherein signals generated by the motion detection system and microphone system are transmitted by the radio communication system to a pet owner and used for the human interface output.

Item 6. The system of above wherein the machine readable instructions further include a lost animal mode that is triggered upon the collar being placed in an open position which in turn results in the display system displaying the pet's name and owner's phone number and the speaker system announcing the last pet's name, and the radio communication system sending a message to the pet owner.

Item 7. The system of above wherein the machine readable instructions include a lost collar mode that is triggered upon either a) the collar is placed in the open position, or 2) the motion detection system fails to report motion for a predetermined amount of time, with the lost collar mode placing the collar into a sleep mode with the sleep mode interrupted after night fall at the top of the hour generating alarm sounds over the speaker and flashes upon the LED lights for a predetermined amount of time.

Item 8. The system of above wherein the machine readable instructions include a behavior capture and behavior modification mode wherein the pet owner, upon observing pet behavior of interest, may trigger a collar smart phone application to record video of the behavior of interest, during the recording, the motion sensor data and microphones audio data are collected by the collar, sent to the pet owner's smart phone and is time synchronized with the video, the time synchronized data used to create a behavior print that may be recognized in the future by the collar with such a recognition used to trigger collar actions to either encourage or discourage the recognized behavior.

Item 9. The system of above wherein the machine readable instructions include a bird deterrent mode wherein the presence of birds is perceived by the motion detection system and/or the microphone system, upon the perception of one or more birds, the speaker system produces sound and the display system produces flashing light.

Item 10. The system of above wherein the machine readable instructions include a not my bowl function wherein a the collar includes a Bluetooth chip detecting welcoming Bluetooth beacon signals from the pet's assigned feeding bowl and the collar's Bluetooth chip detecting unwelcoming Bluetooth beacon signals from other pet food bowls and owner defined out of bound areas, with the receipt of unwelcoming Bluetooth signals triggering negative commands from the collar comprising audio commands, vibration and electric shock.

Item 11. An exoskeleton collar (800) comprising:

a) a plurality of connected outer shell components (810), one or more modules (820), one or more speakers (840) and one or more display screens (850);

b) a load cell assembly comprising a D-ring connected to the load cell assembly, with the load cell assembly measuring forces exerted upon the D-ring with the measured forces reported to a main module, the main module comprising machine readable instructions stored upon non-volatile memory, the machine readable instructions read by a CPU or MCU, the CPU or MCU in communication with a display system, speaker system, a motion detection system, microphone system, radio communication system, GPS and a detachable battery system;

c) the machine readable instructions further including a force pull trigger function using the measured forces upon the D ring to trigger collar actions to discourage a pet's pulling upon the collar, the collar actions comprising vibration, sound, and electric shock;

d) a communication system between the modules, the communication system comprising an open software and open hardware bus protocols.

Item 12. The system above wherein the microphone system comprises a pet microphone and an ambient sound microphone.

Item 13. The system above wherein the ambient sound microphone is located at the top of the collar and the pet microphone is located within the inside surface of the collar upon an animal throat area.

Item 14. The system above wherein the display system comprises the display of images and text to comprise a human interface output and wherein the speaker system comprises audio messages to further comprise the human interface output.

Item 15. The system above wherein signals generated by the motion detection system and microphone system are transmitted by the radio communication system to a pet owner and comprise the human interface output.

Item 16. The system above wherein the machine readable instructions further include a lost animal mode that is triggered upon the collar being placed in an open position which in turn results in the display system displaying the pet's name and owner's phone number and the speaker system announcing the lost pet's name, and the radio communication system sending a message to the pet owner.

Item 17. The system above wherein the machine readable instructions include a lost collar mode that is triggered upon either a) the collar is placed in the open position, or 2) the motion detection system failing to report motion for a predetermined amount of time, with the lost collar mode placing the collar into a sleep mode with the sleep mode interrupted after night fall at the top of the hour generating alarm sounds over the speaker and flashes upon the LED lights for a predetermined amount of time.

Item 18. The system above wherein the machine readable instructions include a behavior capture and behavior modification mode wherein the pet owner, upon observing pet behavior of interest, may trigger a collar smart phone application to record video of the behavior of interest, during the recording, the motion sensor data and microphones audio data is collected by the collar, sent to the owner's smart phone and is time synchronized with the video, the time synchronized data used to create a behavior print that may be recognized in the future by the collar with such a recognition used to trigger collar actions to either encourage or discourage the recognized behavior.

Item 19. The system of above wherein the machine readable instructions include a bird deterrent mode wherein the presence of birds is perceived by the motion detection system and/or the microphone system, upon the perception of one or more birds, the speaker system produces sound and the display system produces flashing light.

Item 20. The system above wherein the machine readable instructions include a not my bowl function wherein a the collar includes a Bluetooth chip detecting welcoming Bluetooth beacon signals from the pet's assigned feeding bowl and the collar's Bluetooth chip detecting unwelcoming Bluetooth beacon signals from other pet food bowls and owner defined out of bound areas, with the receipt of unwelcoming Bluetooth signals triggering negative commands from the collar comprising audio commands, vibration and electric shock.

What is claimed is:

1. A modular break-a-way collar system with integrated electronic modular collar components used for pet tracking and pet training, the system comprising:

a) machine readable instructions stored upon non-volatile memory, the machine readable instructions read by a CPU or MCU, the CPU or MCU in communication with a display system, a speaker system, a motion detection system, a microphone system, a radio communication system, a GPS and a detachable battery system;

b) a collar detachment system comprising a collar body having a first end attached to a latch tongue body, the latch tongue body attached to a latch tongue base, the latch tongue base attached to a latch tongue (610), the latch tongue comprising teeth, the collar body having a second end comprising a female void the female void defined by a lower lip and an upper arch, the second end of the collar body containing a ratcheting mechanism the ratcheting mechanism comporting to the teeth of the latch tongue;

c) a communication system communicating between the modular collar components, the communication system comprising an open software and open hardware bus protocols;

wherein the microphone system comprises a pet microphone and an ambient sound microphone;

wherein the ambient sound microphone is located at a top of the collar and the pet microphone is located within an inside surface of the collar upon an animal throat area.

wherein the display system comprises a display of images and text to comprise a human interface output and wherein the speaker system comprises audio messages to further comprise the human interface output.

2. The system of claim 1 wherein signals generated by at least one of the motion detection system and microphone system are transmitted by the radio communication system to a pet owner and used for the human interface output.

3. The system of claim 2 wherein the machine readable instructions further include a lost animal mode that is triggered upon the collar being placed in an open position which in turn results in the display system displaying the pet's name and owner's phone number and the speaker system announcing the last pet's name, and the radio communication system sending a message to the pet owner.

4. The system of claim 3 wherein the machine readable instructions include a lost collar mode that is triggered upon either a) the collar is placed in the open position, or 2) the motion detection system fails to report motion for a first predetermined amount of time, with the lost collar mode placing the collar into a sleep mode with the sleep mode interrupted after night fall at the top of the hour generating alarm sounds over the speaker and flashes LED lights for a second predetermined amount of time.

5. The system of claim 4 wherein the machine readable instructions include a behavior capture and behavior modification mode wherein the pet owner, upon observing pet behavior of interest, may trigger a collar smart phone application to record video of the behavior of interest, and during the recording, the motion sensor data and microphones audio data are collected by the collar, sent to a pet owner's smart phone and is time synchronized with the video, the time synchronized data used to create a behavior print that may be recognized in the future by the collar with a said recognition print used to trigger collar actions to either encourage or discourage the recognized behavior.

6. The system of claim 5 wherein the machine readable instructions include a bird deterrent mode wherein a presence of one or more birds is perceived by the motion detection system and/or the microphone system, upon the perception of one or more birds, the speaker system produces sound and the display system produces flashing light.

7. The system of claim 6 wherein the machine readable instructions include a not my bowl function wherein a the collar includes a Bluetooth chip detecting welcoming Bluetooth beacon signals from a pet's assigned feeding bowl and the collar's Bluetooth chip detecting unwelcoming Bluetooth beacon signals from other pet food bowls and owner defined out of bound areas, with a receipt of unwelcoming Bluetooth signals triggering negative commands from the collar comprising audio commands, vibration and electric shock.

8. An exoskeleton collar comprising:
 a) a plurality of connected outer shell components, one or more modules, one or more speakers and one or more display screens;
 b) a load cell assembly comprising a D-ring connected to the load cell assembly, with the load cell assembly measuring forces exerted upon the D-ring with the measured forces reported to a main module, the main module comprising machine readable instructions stored upon non-volatile memory, the machine readable instructions read by a CPU or MCU, the CPU or MCU in communication with a display system, speaker system, a motion detection system, microphone system, radio communication system, GPS and a detachable battery system;
 c) the machine readable instructions further including a force pull trigger function using the measured forces upon the D ring to trigger collar actions to discourage a pet's pulling upon the collar, the collar actions comprising vibration, sound, and electric shock;
 d) a communication system for communication between one of the one or more modules and/or the main module, the communication system comprising an open software and open hardware bus protocols;
 wherein the microphone system comprises a pet microphone and an ambient sound microphone;
 wherein the ambient sound microphone is located at the top of a collar and the pet microphone is located within an inside surface of the collar upon an animal throat area; and wherein a display system comprises the display of images and text to comprise a human interface output and wherein the speaker system comprises audio messages to further comprise the human interface output.

9. The exoskeleton collar of claim 8 wherein signals generated by at least one of the motion detection system and microphone system are transmitted by the radio communication system to a pet owner and comprise the human interface output.

10. The exoskeleton collar of claim 9 wherein the machine readable instructions further include a lost animal mode that is triggered upon the collar being placed in an open position which in turn results in the display system displaying a pet's name and owners phone number and the speaker system announcing the lost pet's name, and the radio communication system sending a message to the pet owner.

11. The exoskeleton collar of claim 10 wherein the machine readable instructions include a lost collar mode that is triggered upon either a) the collar is placed in the open position, or 2) the motion detection system failing to report motion for a first predetermined amount of time, with the lost collar mode placing the collar into a sleep mode with the sleep mode interrupted after night fall at the top of the hour generating alarm sounds over the speaker and flashes LED lights for a second predetermined amount of time.

12. The exoskeleton collar of claim 11 wherein the machine readable instructions include a behavior capture and behavior modification mode wherein the pet owner, upon observing pet behavior of interest, may trigger a collar smart phone application to record video of the behavior of interest, and during the recording, motion sensor data and microphones audio data are collected by the collar, sent to a pet owner's smart phone and is time synchronized with the video, the time synchronized data used to create a behavior print that may be recognized in the future by the collar with said recognition print used to trigger collar actions to either encourage or discourage the recognized behavior.

13. The exoskeleton collar of claim 12 wherein the machine readable instructions include a bird deterrent mode wherein a presence of one or more birds is perceived by the motion detection system and/or the microphone system, upon the perception of one or more birds, the speaker system produces sound and the display system produces flashing light.

14. The exoskeleton collar of claim 13 wherein the machine readable instructions include a not my bowl function wherein the collar includes a Bluetooth chip detecting welcoming Bluetooth beacon signals from a pet's assigned feeding bowl and the collar's Bluetooth chip detecting unwelcoming Bluetooth beacon signals from other pet food bowls and owner defined out of bound areas, with a receipt of unwelcoming Bluetooth signals triggering negative commands from the collar comprising audio commands, vibration and electric shock.

* * * * *